(12) United States Patent
Halsema (10) Patent No.: US 8,274,728 B2
(45) Date of Patent: Sep. 25, 2012

(54) LASER BEAM MODULATION FOR PRINTERS USING METAMATERIALS

(75) Inventor: Aillil I. Halsema, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 257 days.

(21) Appl. No.: 12/852,569

(22) Filed: Aug. 9, 2010

(65) Prior Publication Data

US 2012/0033283 A1    Feb. 9, 2012

(51) Int. Cl.
G02B 26/00   (2006.01)
G02F 1/03    (2006.01)

(52) U.S. Cl. .................. 359/245; 359/237; 359/900

(58) Field of Classification Search .................. 359/237, 359/245, 257, 258, 900
See application file for complete search history.

(56) References Cited

U.S. PATENT DOCUMENTS 5,363,126 A    11/1994   Andrews

OTHER PUBLICATIONS

Burgos et al., "A single-layer wide-angle negative-index metamaterial at visible frequencies," Letter abstract, http://www.natgure.com/nmat/journal/v9/n5/abs/nmat2747.html, accessed Apr. 30, 2010, 1 pg.
Mirza et al., "Experimental Demonstration of Metamaterial-Based Phased Modulation," Progress in Electromagnetics Research, PIER 93, 1-12, 2009, 12 pgs.
Cummer et al., "Full-wave simulations of electromagnetic cloaking structures," Physical Review E 74, 036621 (2006), 5 pgs.
Robert F. Service, "Next Wave of Metamaterials Hopes to Fuel the Revolution," Jan. 8, 2010, vol. 327, Science, www.sciencemag.org, pp. 138-139.
Subramania et al, "Nano-lithographically fabricated titanium dioxide based visible frequency three dimensional gap photonic crystal," Oct. 1, 2007, vol. 15, No. 20, Optics Express, pp. 13049-13057.
"Team develops new metamaterial device," Feb. 24, 2009, http://www.physorg.com/news154698749.html, accessed Jun. 8, 2010, 2 pgs.
Tech News Watch, Sent Wednesday, Jun. 2, 2010, 3 pgs.

*Primary Examiner* — Jack Dinh
(74) *Attorney, Agent, or Firm* — Fay Sharpe, LLP (57) ABSTRACT

A modulator in an imaging apparatus includes a metamaterial shell surrounding an opaque core. The metamaterial is tunable, so that the metamaterial acts as a waveguide for light at a given wavelength. This property of the metamaterial is used to modulate the light beam in an imaging apparatus. The light beam can be guided around the opaque core under a first voltage condition, or the light beam can be blocked by the opaque core under a second voltage condition.

20 Claims, 4 Drawing Sheets

LASER BEAM MODULATION FOR PRINTERS USING METAMATERIALS

BACKGROUND

The present disclosure relates to methods and apparatuses that are useful in an imaging apparatus for producing printed copies. In particular, the methods and apparatuses relate to using a tunable metamaterial for modulating a light beam during the imaging process.

A typical flexible electrophotographic imaging member belt comprises at least one photoconductive layer. The imaging member is imaged by uniformly depositing an electrostatic charge on the imaging surface of the electrophotographic imaging member and then exposing the imaging member to a pattern of activating electromagnetic radiation, such as light, which selectively dissipates the charge in the illuminated areas of the imaging member to create an electrostatic latent image in the non-illuminated areas. Put another way, a light beam, such as from a laser or a light-emitting diode, is used to selectively dissipate charges in specific locations on the imaging member. This electrostatic latent image may then be developed to form a visible image by depositing finely divided electroscopic marking toner particles on the imaging member surface. The resulting visible image can then be transferred to a suitable receiving member or substrate, such as paper.

To create the light pattern that is applied to the surface of the imaging member, the light beam must be switched on and off at an extremely high speed. Because switching the light source (typically a laser) on and off may not be practical or economical, a modulator is used. Generally speaking, the modulator is used to interrupt the light beam as it travels from a light source to the imaging member.

Specific modulators include Pockels cells and Kerr cells. Pockels cells and Kerr cells take advantage of changes in the refractive index of a material in response to an applied electric field. Generally speaking, when combined with polarizers, light will be transmitted through these cells when an electric field is applied, and will not be transmitted when the electric field is turned off.

Pockels cells require manual adjustment and complex driver electronics for operation. In addition, if the crystal axis and ray axis are not aligned, a large phase shift and thus modulation errors occur. Kerr cells generally contain nitrobenzene, which is recognized as a highly toxic, hazardous material that is readily absorbed through human skin.

In addition, both Pockels cells and Kerr cells require either a high voltage (thousands of volts) or high amperage (tens of amperes) external electric field. Both types of cells also exhibit limited frequency response.

It would be desirable to develop modulation devices and methods that overcome the deficiencies of Pockels cells and Kerr cells for use with imaging apparatuses.

BRIEF DESCRIPTION

The present application discloses, in various embodiments, methods for modulating a light beam in an imaging apparatus, such as a printer. Also disclosed are imaging apparatuses in which the methods may be performed. Generally, modulation is performed by applying a light beam to a filter, wherein the filter includes an opaque core and a metamaterial shell surrounding the opaque core. When a modulating voltage is applied to the filter, the metamaterial guides the light beam around the opaque core and through the modulator. When the modulating voltage is removed, the laser light is blocked by the opaque core. This results in a modulator that is capable of forming an on/off light pattern that can be used to create an electrostatic latent image on an imaging member.

Disclosed in embodiments is a modulator for controlling the path of an associated light beam, comprising: a housing having an entry aperture and an exit aperture, the entry aperture and the exit aperture defining a beam path; and a filter in the beam path; the filter comprising an opaque core and a metamaterial shell surrounding the opaque core; wherein the metamaterial assists the associated light beam in travelling from the entry aperture to the exit aperture under a first voltage condition; and wherein the opaque core prevents the associated light beam from travelling from the entry aperture through the exit aperture under a second voltage condition.

The beam path may be a straight line between the entry aperture and the exit aperture. The filter may have a cylindrical or spherical shape. The filter may have a circular cross-section.

In embodiments, the first voltage condition is a non-zero voltage, and the second voltage condition is zero voltage.

The opaque core can be formed from a material selected from the group consisting of materials that are absorptive at the wavelength of the light beam being modulated. The opaque core may have a diameter of from about 445 nanometers to about 7000 nanometers. The metamaterial shell is a metamaterial with an electrically controllable negative index of refraction. Some materials displaying this property include photonic metamaterials. In embodiments, the metamaterial shell has a thickness of from about 1 nanometer to about 7 nanometers.

Also disclosed are methods for printing using an imaging apparatus, the methods comprising: directing a light beam through a filter towards an imaging member, wherein the filter comprises an opaque core and a metamaterial shell surrounding the opaque core; and applying a modulating voltage to the filter; wherein the metamaterial guides the light beam to the imaging member when the modulating voltage is applied; and wherein the opaque core prevents the light beam from reaching the imaging member when the modulating voltage is not applied.

The light beam may have a wavelength of from about 445 nm to about 700 nm.

Also disclosed are imaging apparatuses, comprising: a light source for producing a light beam; an imaging member; and a modulator between the light source and the imaging member. The modulator comprises: a housing having an entry aperture and an exit aperture, the entry aperture and the exit aperture defining a beam path for the light beam; and a filter in the beam path; the filter comprising an opaque core and a metamaterial layer surrounding the opaque core; wherein the metamaterial assists the light beam in travelling through the modulator to the imaging member under a first voltage condition; and wherein the opaque core prevents the light beam from contacting the imaging member under a second voltage condition.

In embodiments, the light source emits a coherent light beam having a first wavelength of from about 445 nm to about 700 nm, and the metamaterial has a negative refractive index at the first wavelength sufficient to bend the light beam around the opaque core.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range of "from about 2 to about 10" also discloses the range "from 2 to 10."

As used herein, the term "metamaterial" refers to a synthetic material that is engineered to have properties not readily available in nature. In particular, the metamaterials discussed herein have a negative refractive index over certain frequency ranges when an electrical field is applied. No known natural materials exhibit this property. Generally, the metamaterial has structural features smaller than the wavelength of the electromagnetic waves which it affects.

The term "imaging apparatus" as used herein encompasses any apparatus, such as a digital copier, bookmaking machine, fax machine, multi-function machine, and the like, which performs a print outputting function for any purpose. The term can encompass embodiments that print in color or in monochrome.

The present disclosure relates to methods for modulating a light beam in an imaging apparatus. A light beam is produced by a light source and passes through a modulator. The modulator includes an opaque core and a metamaterial shell. When a modulating voltage is applied, the metamaterial guides the light beam around the opaque core to an imaging member. When the modulating voltage is not being applied, the opaque core prevents the light beam from reaching the imaging member. The imaging apparatus may be a printer.

Also disclosed are modulators for use in imaging apparatuses. The modulator comprises a housing and a filter. The housing has an entry aperture and an exit aperture. A light beam travels in a beam path between the entry aperture and the exit aperture. The filter comprises an opaque core and a metamaterial shell surrounding the opaque core. Again, when a modulating voltage is applied, the metamaterial assists the light beam in travelling from the entry aperture to the exit aperture around the opaque core. When the modulating voltage is not being applied, the opaque core prevents the light beam from travelling through the exit aperture. For example, the opaque core may reflect or absorb the light beam.

Figure 1:
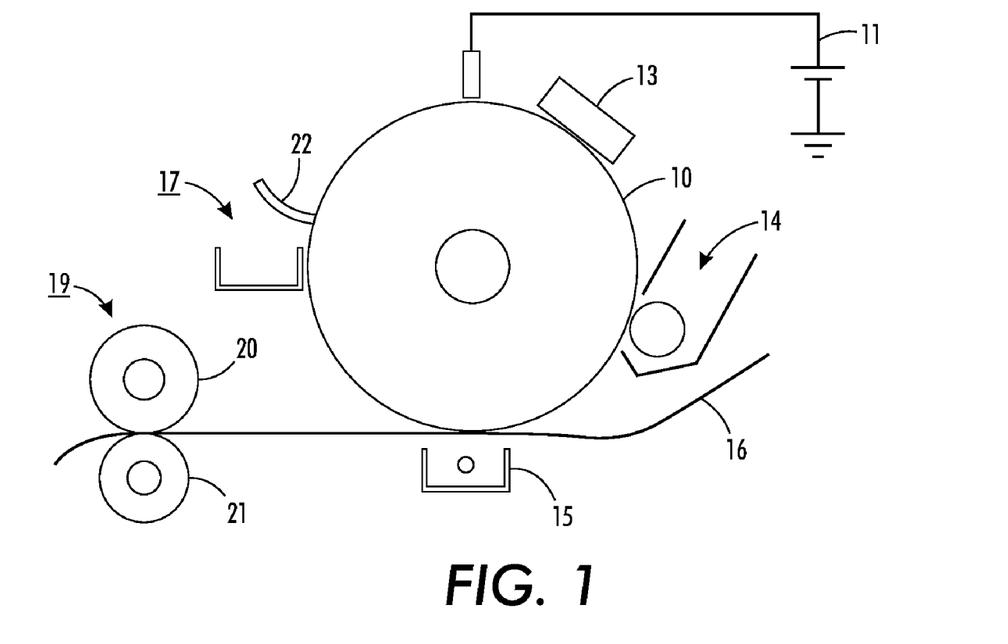
FIG. 1 is a diagram illustrating the general printing process.

Referring to FIG. 1, in a typical electrostatographic imaging apparatus, a light image of an original document to be copied is recorded in the form of an electrostatic latent image upon a photosensitive imaging member and the latent image is subsequently rendered visible by the application of electroscopic toner particles. More specifically, photoreceptor drum 10 is charged on its surface by means of an electrical charger 12 to which a voltage has been supplied from power supply 11. The photoreceptor drum is then imagewise exposed to light from an optical imaging system 13 to form an electrostatic latent image thereon. Generally, the electrostatic latent image is developed by bringing a developer mixture from development component 14 into contact therewith. Development can be effected by use of a magnetic brush, powder cloud, or other known development process.

After the toner particles have been deposited on the photoconductive surface, they are transferred to a copy sheet 16 by transfer component 15, which can be pressure transfer or electrostatic transfer. The developed image can be transferred to an intermediate transfer member (not shown here) and subsequently transferred to a copy substrate, such as paper, or transferred directly to a copy substrate.

After the transfer of the developed image is completed, copy sheet 16 advances to fusing station 19, wherein the developed image is fused to copy sheet 16 by passing copy sheet 16 between the fusing member 20 and pressure member 21, thereby forming a permanent image. The photoreceptor drum 10, after the transfer, advances to cleaning station 17, wherein any toner left on photoreceptor drum 10 is cleaned therefrom by use of a cleaning mechanism 22, such as a blade, brush, or other cleaning apparatus.

Figure 2:
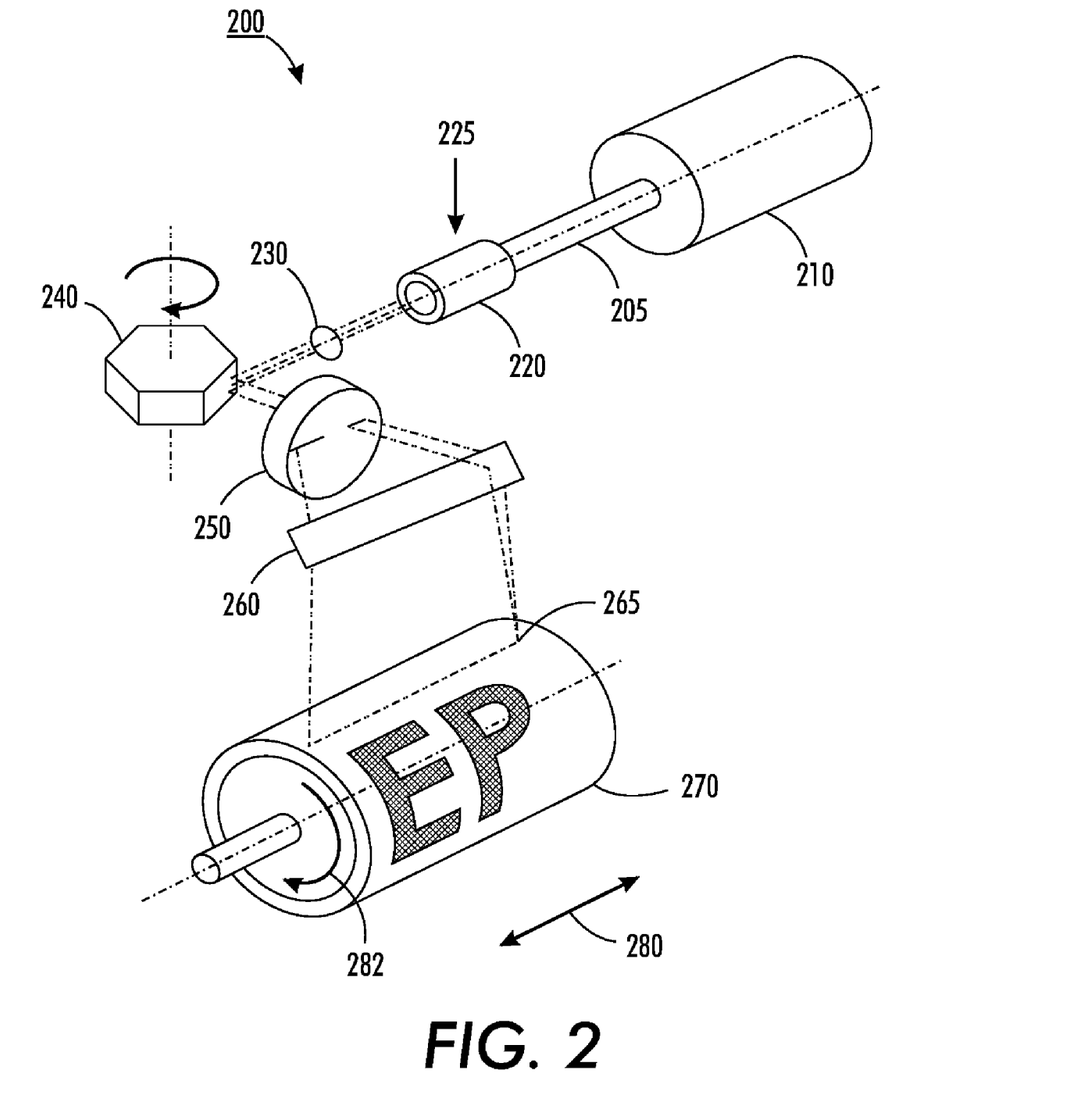
FIG. 2 is a diagram illustrating a light imaging system used in an imaging apparatus.

FIG. 2 shows the components of an exemplary optical imaging system 200 that can be used as the optical imaging system 13 of FIG. 1. This particular system is also known as a raster output scanner (ROS). A light source 210 generates a light beam 205. The light beam is preferably monochromatic and collimated. Light sources that meet these requirements include lasers and certain light emitting diodes (LEDs). The light beam is modulated (i.e. converted to an on/off signal) to conform with the image information provided by a digital imaging signal 225. Modulation is performed by modulator 220.

The modulated light beam is then directed to the imaging member by an optics system to form the desired image on the surface of the imaging member. The modulated laser beam is transmitted through a lens 230 onto a scanning element, typically a rotating polygon 240 having mirrored facets, such that the light beam is reflected from a facet through post-polygon optics 250 along a mirror 260, so that the light beam is focused to a particular spot 265 on the imaging member 270.

The rotation of the polygon 240 causes the spot to scan linearly across the imaging member in a fast scan (i.e., scan line) direction (indicated by reference numeral 280). Meanwhile, the imaging member 270 is advanced in a process direction 282 orthogonal to the scan line direction and relatively more slowly than the rate of the fast scan, the so-called slow scan direction. In this manner, the modulated light beam is scanned across the recording medium as an array of scan lines in a raster scanning pattern. The light beam is intensity-modulated in accordance with an input image serial data stream at a rate such that individual picture elements of the image, called pixels, represented by the data stream are exposed on the imaging member as a series of parallel lines to form the latent image.

Figure 3:
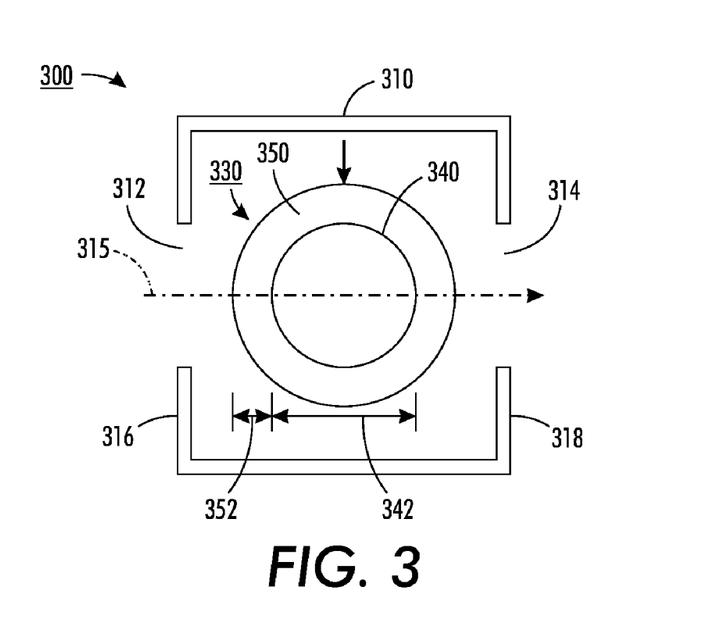
FIG. 3 shows an embodiment of a modulator of the present disclosure.

An exemplary modulator of the present disclosure is shown in cross-sectional view in FIG. 3. The modulator 300 has a housing 310. The housing 310 has an entry aperture 312 and an exit aperture 314. A light beam will enter the housing 310 through the entry aperture and exit the housing through the exit aperture. Put another way, the entry aperture 312 and exit aperture 314 define a beam path 315. Generally, the entry aperture and exit aperture are located so that a light beam entering the entry aperture follows a straight line to exit out of the exit aperture. For example, the entry aperture 312 may simply be located in a wall 316 of the housing that is opposite another wall 318 in which the exit aperture 314 is located. The housing 310 can generally be of any desired shape. For example, as seen in FIG. 2, the housing 310 has a cylindrical shape. The entry aperture 312 and exit aperture 314 are generally of a circular shape.

Located inside the housing 310 is a filter 330. The filter comprises an opaque core 340 and a metamaterial shell 350. The metamaterial shell 350 surrounds the opaque core, or in other words forms a layer around the opaque core. The filter 330 is located within the housing 310 so that the opaque core 340 is in the beam path 315. It is contemplated that a light beam coming from a light source and entering through the entry aperture 312 would hit the filter 330.

As shown in FIG. 3, the filter 330 has a circular cross-section. The core 340 also has a circular cross-section, while the metamaterial shell 350 has an annular cross-section. The diameter 342 of the core is at least equal to the wavelength of the light at the frequency to be modulated, and may be 2 to 10 times the wavelength which is desired to be modulated. For example, if the light beam to be modulated has a wavelength of 450 nm, the diameter should be at least 450 nm, and could be as large as 4500 nm. In embodiments, the diameter is from about 445 nm to about 7000 nm. The metamaterial shell 350 may have a thickness 352 of from about 1 nanometer to about 7 nanometers, or a thickness of about 1/100 of the wavelength of the light that is being modulated. It is believed that the circular cross-sectional shape is necessary to provide a waveguide by which light entering the entry aperture 312 contacts the metamaterial 350 and travels around the core 340 to pass out the exit aperture 314, as will be explained further herein.

In some embodiments, the core and the overall filter have the three-dimensional shape of a cylinder or a sphere. However, the shape of the opaque core and filter are generally not limited, as long as its function of preventing light from passing through the core is fulfilled. In this regard, the core may generally be comprised of any material that is opaque. A material is considered "opaque" if a light beam shining on one side of the material cannot be seen on an opposite side of the material. For example, the opaque core may absorb the light, or the core may reflect the light elsewhere. Suitable materials for the opaque core include any material that can absorb the relevant light wavelength of the beam to be modulated, such as polymers like polypropylene, polyethylene, polystyrene; various minerals such as graphite, magnetite, or pyrite; or nanomaterials such as graphenes or fullerenes.

The metamaterial from which the shell or layer 350 is formed generally has a negative refractive index. More specifically, the metamaterial has a negative refractive index for a given wavelength of light in an electric field having a stated strength. The strength of that electric field is proportional to the voltage applied. Generally speaking, a metamaterial comprises small features with a dimension smaller than the wavelength of light that the metamaterial is designed to affect. These features are critical to achieving a negative refraction index for a certain wavelength of electromagnetic radiation.

The metamaterial may comprise a host medium and a plurality of inclusions embedded therein or thereon. The inclusions may be, for example, split-ring resonators (SRRs). SRRs are made of two incomplete concentric rings, with each ring having a split so that the ring has a shape like the letter "C". The split of the inner ring is 180° apart from the split of the outer ring. Other inclusion structures are known. Generally, the metamaterial consists of structures, i.e. resonant cells, that are much smaller than the wavelength of the light being modulated. In some embodiments, the metamaterial is constructed with alternating metallic and insulating layers, each layer having a thickness much smaller than the wavelength of the light to be modulated. For example, each layer may have a thickness of 0.01 times the wavelength of the light to be modulated.

The metamaterial used in the modulator of the present disclosure is tunable. In other words, when a voltage is applied to the metamaterial, the refractive index of the metamaterial for a given wavelength will change. In particular embodiments, it is contemplated that the light beam passing though the modulator is a laser beam, i.e. a coherent light beam of one wavelength. In such embodiments, the wavelength of the metamaterial that is affected by the applied voltage should be substantially equal to the wavelength of the laser beam. See for example, "A metamaterial solid-state terahertz phase modulator", *Nature Photonics* 3, 148-151 (2009); *Optics Express* 15, 13049 (2007); *Science*, 8 Jan. 2010, Vol. 327. no. 5962, pp. 138-139; "Self-Assembled Plasmonic Nanoparticle Clusters", *Science* 28 May 2010, Vol. 328. no. 5982, pp. 1135-1138.

Figure 4:
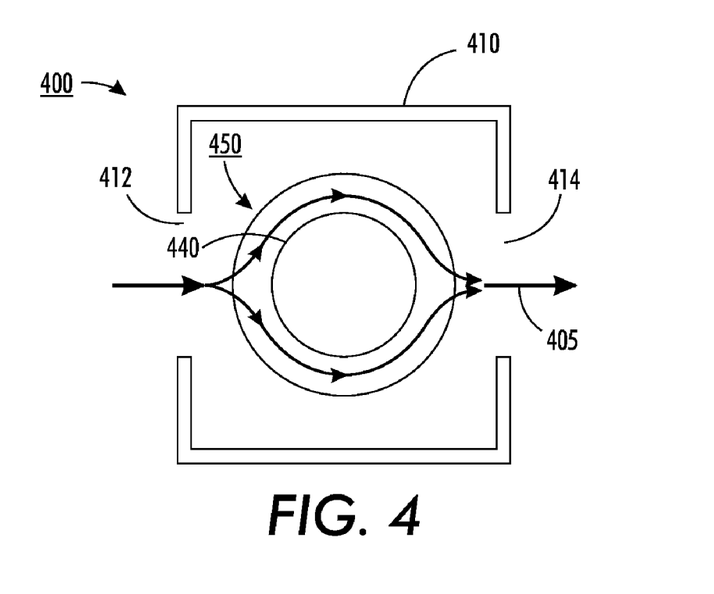
FIG. 4 illustrates the use of the modulator at a first modulating voltage.
Figure 5:
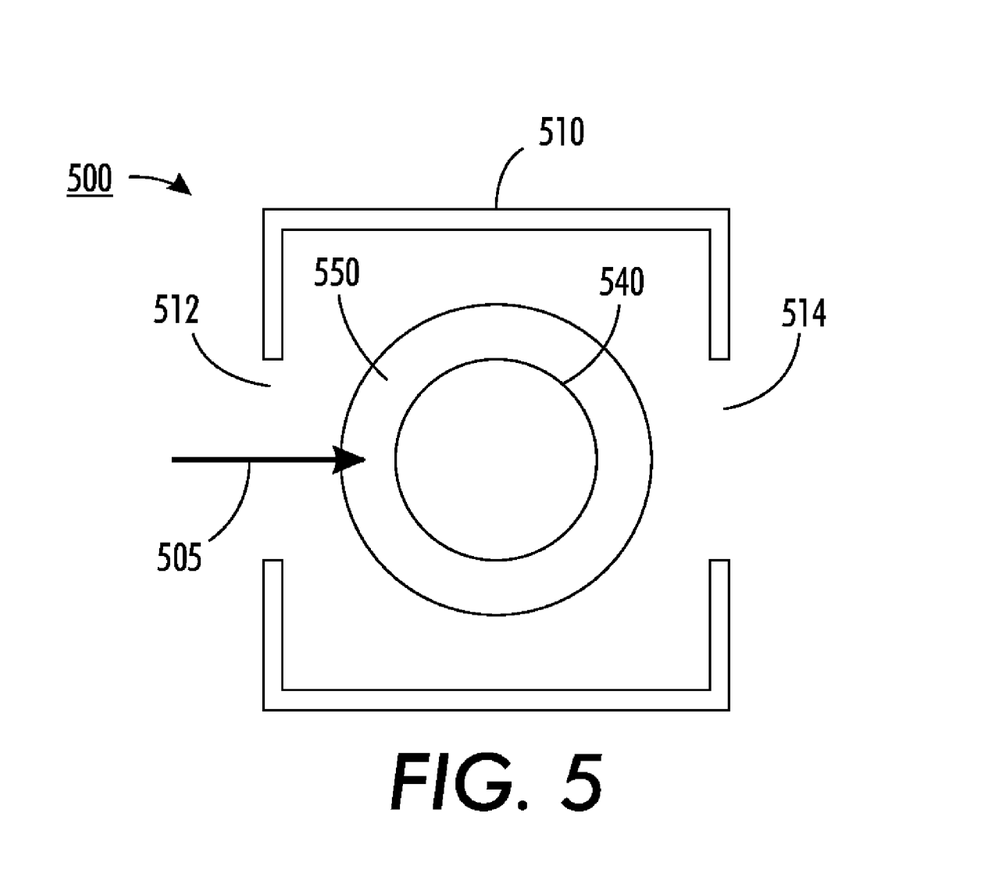
FIG. 5 illustrates the use of the modulator at a second, different, modulating voltage.

FIG. 4 and FIG. 5 illustrate how the metamaterial acts to modulate a light beam under different voltage conditions.

FIG. 4 shows the modulator under a first voltage condition. In particular embodiments, this first voltage condition is a non-zero voltage, or in other words an electric field or potential is being applied to the modulator. Laser beam 405 enters the modulator 400 through entry aperture 412 and hits the metamaterial shell 450. Here, the metamaterial has a negative refractive index at the wavelength of the laser beam at this first voltage condition, the negative refractive index being sufficient to bend the laser beam around the opaque core 440. As a result, the metamaterial 450 assists or guides the laser beam around the opaque core 440. The laser beam can subsequently travel through the exit aperture 414. Put another way, the metamaterial assists the laser beam 405 in travelling from the entry aperture 412 to the exit aperture 414 in this first voltage condition.

FIG. 5 shows the same modulator of FIG. 4 under a second voltage condition. The first and second voltage conditions are different. In particular embodiments, this second voltage condition is at zero voltage, i.e. when no electric field is being applied to the modulator. Here, laser beam 505 emitted by a laser again enters the modulator 500 through entry aperture 512 and hits the metamaterial shell 550. Here, the metamaterial does not have a negative refractive index at the wavelength of the laser beam sufficient to bend the laser beam around the opaque core 540. As a result, the laser beam 505 hits the opaque core 540. Put another way, the opaque core 540 prevents the laser beam 505 from travelling from the entry aperture 512 to the exit aperture 514 in this second voltage condition.

The light 505 can be absorbed or reflected by the opaque core 540. When the light is reflected, the exit aperture 514 should be small enough to ensure that the reflected light does not exit the modulator housing 510. Alternatively, the housing can absorb the reflected light. As a result, the laser beam 505 will not reach the imaging member (not shown) beyond the modulator. Thus, the laser beam 505 can be effectively modulated by turning on and off the modulating voltage to the modulator.

Metamaterials have achieved success at a single wavelength of electromagnetic radiation and in modulators having a small aperture. These two properties match well with imaging apparatuses, which typically use a laser configured to emit light at a single wavelength. Thus, the limitations on the effectiveness of metamaterials are a lesser concern in imaging apparatus applications.

In particular embodiments, the laser used in the imaging apparatus is configured to emit light having a wavelength of from about 445 nm to about 700 nm. More specifically, the laser may be configured to emit light with a wavelength of about 700 nm. The laser will generally be configured to emit light at only a single wavelength within these ranges.

The success of modulation using metamaterials may also depend on the size of the exit aperture in the modulator. In particular, the aperture size should be limited to prevent light from escaping the modulator when the opaque core is blocking transmission of light. In particular embodiments, the exit aperture may have a diameter of about 1 wavelength of the light in the modulated monochromatic light beam, i.e. a diameter of from about 445 nm to about 700 nm. In usual embodiments, the entry aperture and the exit aperture have the same diameter.

The modulator is used in an imaging apparatus to modulate the light being focused on the imaging member. The electrophotographic imaging member generally comprises a substrate, an electrically conductive layer when the substrate is not electrically conductive, a charge generating layer, and a charge transport layer. The imaging member typically will receive an electrical charge that is discharged in those areas illuminated by the modulated beam of light, but will retain the electrical charge in those areas not so illuminated.

The substrate provides support for all layers of the imaging member. Its thickness depends on numerous factors, including mechanical strength, flexibility, and economical considerations; the substrate for a flexible belt may, for example, be from about 50 micrometers to about 150 micrometers thick, provided there are no adverse effects on the final electrophotographic imaging device. The substrate support is not soluble in any of the solvents used in each coating layer solution, is optically transparent, and is thermally stable up to a high temperature of about 150° C. A typical substrate support is a biaxially oriented polyethylene terephthalate. Another suitable substrate material is a biaxially oriented polyethylene naphthalate, having a thermal contraction coefficient ranging from about $1\times10^{-5}/°$ C. to about $3\times10^{-5}/°$ C. and a Young's Modulus of from about $5\times10^5$ psi to about $7\times10^5$ psi. However, other polymers are suitable for use as substrate supports. The substrate support may also be made of a conductive material, such as aluminum, chromium, nickel, brass and the like. The substrate support may flexible or rigid, seamed or seamless, and have any configuration, such as a plate, drum, scroll, belt, and the like. In particular embodiments of imaging members of the present disclosure, the substrate is electrically conductive, so that a conductive layer is not present between the substrate and the undercoat layer of the present disclosure.

An optional conductive layer is present when the substrate is not itself conductive. It may vary in thickness depending on the optical transparency and flexibility desired for the electrophotographic imaging member. Accordingly, when a flexible electrophotographic imaging belt is desired, the thickness of the conductive layer may be from about 20 Angstrom units to about 750 Angstrom units, and more specifically from about 50 Angstrom units to about 200 Angstrom units for an optimum combination of electrical conductivity, flexibility and light transmission. The conductive layer may be formed on the substrate by any suitable coating technique, such as a vacuum depositing or sputtering technique. Typical metals suitable for use as the conductive layer include aluminum, zirconium, niobium, tantalum, vanadium, hafnium, titanium, nickel, stainless steel, chromium, tungsten, molybdenum, and the like.

Any suitable charge generating layer may be applied which can thereafter be coated over with a contiguous charge transport layer. The charge generating layer generally comprises a charge generating material and a film-forming polymer binder resin. Charge generating materials such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof may be appropriate because of their sensitivity to white light. Vanadyl phthalocyanine, metal free phthalocyanine and tellurium alloys are also useful because these materials provide the additional benefit of being sensitive to infrared light. Other charge generating materials include quinacridones, dibromo anthanthrone pigments, benzimidazole perylene, substituted 2,4-diamino-triazines, polynuclear aromatic quinones, and the like. Benzimidazole perylene compositions are well known and described, for example, in U.S. Pat. No. 4,587,189, the entire disclosure thereof being incorporated herein by reference. Other suitable charge generating materials known in the art may also be utilized, if desired. The charge generating materials selected should be sensitive to activating radiation having a wavelength from about 600 to about 700 nm during the imagewise radiation exposure step in an electrophotographic imaging process to form an electrostatic latent image. In specific embodiments, the charge generating material is hydroxygallium phthalocyanine (OHGaPC) or oxytitanium phthalocyanine (TiOPC).

Any suitable inactive film forming polymeric material may be employed as the binder in the charge generating layer, including those described, for example, in U.S. Pat. No. 3,121,006, the entire disclosure thereof being incorporated herein by reference. Typical organic polymer binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, and the like.

The charge generating material can be present in the polymer binder composition in various amounts. Generally, from about 5 to about 90 percent by volume of the charge generating material is dispersed in about 10 to about 95 percent by volume of the polymer binder, and more specifically from about 20 to about 50 percent by volume of the charge generating material is dispersed in about 50 to about 80 percent by volume of the polymer binder.

The charge generating layer generally ranges in thickness of from about 0.1 micrometer to about 5 micrometers, and more specifically has a thickness of from about 0.3 micrometer to about 3 micrometers. The charge generating layer thickness is related to binder content. Higher polymer binder content compositions generally require thicker layers for charge generating. Thickness outside these ranges can be selected in order to provide sufficient charge generating.

The charge transport layer comprises charge transport materials which are capable of supporting the injection of photogenerated holes or electrons from the charge generating layer and allowing their transport through the charge transport layer to selectively discharge the surface charge on the imaging member surface. The charge transport layer, in conjunction with the charge generating layer, should also be an insulator to the extent that an electrostatic charge placed on the charge transport layer is not conducted in the absence of illumination. It should also exhibit negligible, if any, discharge when exposed to a wavelength of light useful in xerography, e.g., about 4000 Angstroms to about 9000 Angstroms. This ensures that when the imaging member is exposed, most of the incident radiation is used in the charge generating layer beneath it to efficiently produce photogenerated charges.

The charge transport materials may include triarylamines such as N,N'-diphenyl-N,N'-bis(3-methylphenyl)-(1,1'-biphenyl)-4,4'-diamine (TPD), tri-p-tolylamine, 1,1-bis(4-di-p-tolylaminophenyl)cyclohexane, and other similar triarylamines. The additional charge transport molecules may, e.g., help minimize background voltage.

The charge transport layer also comprises a polymer binder resin in which the charge transport molecule(s) or component(s) is dispersed. The resin should be substantially soluble in a number of solvents, like methylene chloride or other solvent so that the charge transport layer can be coated onto the imaging member. Typical binder resins soluble in methylene chloride include polycarbonate resin, polyvinylcarbazole, polyester, polyarylate, polyacrylate, polyether, polysulfone, polystyrene, polyamide, and the like. Molecular weights of the binder resin can vary from, for example, about 20,000 to about 300,000, including about 150,000.

The charge transport layer of the present disclosure in embodiments comprises from about 25 weight percent to about 60 weight percent of the charge transport molecule(s) and from about 40 weight percent to about 75 weight percent by weight of the polymer binder resin, both by total weight of the charge transport layer. In specific embodiments, the charge transport layer comprises from about 40 weight percent to about 50 weight percent of the charge transport molecule(s) and from about 50 weight percent to about 60 weight percent of the polymer binder resin.

Generally, the thickness of the charge transport layer is from about 10 to about 100 micrometers, including from about 20 micrometers to about 60 micrometers, but thicknesses outside these ranges can also be used. In general, the ratio of the thickness of the charge transport layer to the charge generating layer is in embodiments from about 2:1 to 200:1 and in some instances from about 2:1 to about 400:1. In specific embodiments, the charge transport layer is from about 10 micrometers to about 40 micrometers thick.

An optional anti-curl back coating can be applied to the back side of the substrate support (which is the side opposite the side bearing the electrically active coating layers) in order to render flatness. Although the anti-curl back coating may include any electrically insulating or slightly conductive organic film forming polymer, it is usually the same polymer as used in the charge transport layer polymer binder. An anti-curl back coating from about 7 to about 30 micrometers in thickness is found to be adequately sufficient for balancing the curl and render imaging member flatness.

An electrophotographic imaging member may also include an optional ground strip layer. The ground strip layer comprises, for example, conductive particles dispersed in a film forming binder and may be applied to one edge of the photoreceptor to operatively connect charge transport layer, charge generating layer, and conductive layer for electrical continuity during electrophotographic imaging process. The ground strip layer may comprise any suitable film forming polymer binder and electrically conductive particles. The ground strip layer may have a thickness from about 7 micrometers to about 42 micrometers, and more specifically from about 14 micrometers to about 23 micrometers.

An overcoat layer, if desired, may be utilized to provide imaging member surface protection as well as improve resistance to abrasion. Overcoat layers are known in the art. Generally, they serve a function of protecting the charge transport layer from mechanical wear and exposure to chemical contaminants.

The imaging member formed may have a rigid drum configuration or a flexible belt configuration. The belt can be either seamless or seamed. In this regard, the fabricated multilayered flexible photoreceptors of the present disclosure may be cut into rectangular sheets and converted into photoreceptor belts. The two opposite edges of each photoreceptor cut sheet are then brought together by overlapping and may be joined by any suitable means including ultrasonic welding, gluing, taping, stapling, and pressure and heat fusing to form a continuous imaging member seamed belt, sleeve, or cylinder. The prepared imaging member may then be employed in any suitable and conventional electrophotographic imaging process which utilizes uniform charging prior to imagewise exposure to activating electromagnetic radiation. When the imaging surface of an electrophotographic member is uniformly charged with an electrostatic charge and imagewise exposed to activating electromagnetic radiation, conventional positive or reversal development techniques may be employed to form a marking material image on the imaging surface of the electrophotographic imaging member of this disclosure. Thus, by applying a suitable electrical bias and selecting toner having the appropriate polarity of electrical charge, one may form a toner image in the charged areas or discharged areas on the imaging surface of the electrophotographic member of the present disclosure.

While particular embodiments have been described, alternatives, modifications, variations, improvements, and substantial equivalents that are or may be presently unforeseen may arise to applicants or other skilled in the art. Accordingly, the appended claims as filed and as they are amended are intended to embrace all such alternatives, modifications, variations, improvements, and substantial equivalents.

What is claimed is:

1. A modulator for controlling the path of an associated light beam, comprising:
   a housing having an entry aperture and an exit aperture, the entry aperture and the exit aperture defining a beam path; and
   a filter in the beam path;
   the filter comprising an opaque core and a metamaterial shell surrounding the opaque core;
   wherein the metamaterial assists the associated light beam in travelling from the entry aperture to the exit aperture under a first voltage condition; and wherein the opaque core prevents the associated light beam from travelling from the entry aperture through the exit aperture under a second voltage condition.

2. The modulator of claim 1, wherein the filter has a cylindrical shape.

3. The modulator of claim 1, wherein the first voltage condition is a non-zero voltage, and the second voltage condition is zero voltage.

4. The modulator of claim 1, wherein the opaque core is formed from a material that is absorptive at a wavelength of the associated light beam.

5. The modulator of claim 1, wherein the beam path is a straight line.

6. The modulator of claim 1, wherein the filter has a circular cross-section.

7. The modulator of claim 1, wherein the metamaterial shell has a thickness of from about 1 nanometer to about 7 nanometers.

8. The modulator of claim 1, wherein the opaque core has a diameter of from about 445 nanometers to about 7000 nanometers.

9. A method for printing using an imaging apparatus, the method comprising:
   directing a light beam through a filter towards an imaging member, wherein the filter comprises an opaque core and a metamaterial shell surrounding the opaque core; and
   applying a modulating voltage to the filter;
   wherein the metamaterial guides the light beam to the imaging member when the modulating voltage is applied; and
   wherein the opaque core prevents the light beam from reaching the imaging member when the modulating voltage is not applied.

10. The method of claim 9, wherein the light beam has a wavelength of from about 445 nm to about 700 nm.

11. The method of claim 9, wherein the opaque core has a cylindrical shape.

12. The method of claim 9, wherein the filter is located in a modulator having an entry aperture and an exit aperture; wherein the light beam enters the modulator through the entry aperture; and wherein the light beam exits the modulator through the exit aperture.

13. The method of claim 9, wherein the opaque core is formed from a material that is absorptive at a wavelength of the light beam.

14. The method of claim 9, wherein the metamaterial is selective for the wavelength of the light beam.

15. An imaging apparatus, comprising:
   a light source for producing a light beam;
   an imaging member; and
   a modulator between the light source and the imaging member;
   wherein the modulator comprises:
      a housing having an entry aperture and an exit aperture, the entry aperture and the exit aperture defining a beam path for the light beam; and
      a filter in the beam path;
      the filter comprising an opaque core and a metamaterial layer surrounding the opaque core;
      wherein the metamaterial assists the light beam in travelling through the modulator to the imaging member under a first voltage condition; and
      wherein the opaque core prevents the light beam from contacting the imaging member under a second voltage condition.

16. The apparatus of claim 15, wherein the light source emits a coherent light beam having a first wavelength of from about 445 nm to about 700 nm, and wherein the metamaterial has a negative refractive index at the first wavelength sufficient to bend the light beam around the opaque core.

17. The apparatus of claim 15, wherein the opaque core has a cylindrical or spherical shape.

18. The apparatus of claim 15, wherein the opaque core is formed from a material that is absorptive at a wavelength of the light beam.

19. The apparatus of claim 15, wherein the opaque core has a diameter of from about 445 nm to about 700 nm.

20. The apparatus of claim 15, wherein the metamaterial layer has a thickness of about 1/100 of a wavelength of the light beam.

* * * * *